US006471313B1

United States Patent
Ueda et al.

(10) Patent No.: US 6,471,313 B1
(45) Date of Patent: Oct. 29, 2002

(54) CORNER COVER MOUNTING STRUCTURE FOR HEAT-INSULATED HOUSING FOR USE IN REFRIGERATOR

(75) Inventors: Hideki Ueda, Aichi (JP); Mitsuyuki Takaoka, Toyoake (JP); Taito Yamakawa, Nagoya (JP)

(73) Assignee: Hoshizaki Denki Co., Ltd., Aichi (JP)

( * ) Notice: Subject to any disclaimer, the term of this patent is extended or adjusted under 35 U.S.C. 154(b) by 0 days.

(21) Appl. No.: 09/459,378

(22) Filed: Dec. 13, 1999

(51) Int. Cl.⁷ .............................................. A47B 96/04
(52) U.S. Cl. ....................... 312/406.2; 312/401; 24/297
(58) Field of Search .................. 312/400, 401, 312/406, 406.2, 407, 407.1; 403/231, 397; 24/297

(56) References Cited

U.S. PATENT DOCUMENTS

| | | | | |
|---|---|---|---|---|
| 4,627,760 A | * | 12/1986 | Yagi et al. ................. | 24/297 X |
| 4,642,957 A | * | 2/1987 | Edwards ................. | 403/231 X |
| 4,644,614 A | * | 2/1987 | Mizusawa ................. | 24/297 X |
| 4,712,341 A | * | 12/1987 | Harris, Jr. et al. ........ | 24/297 X |
| 5,269,602 A | * | 12/1993 | Kuwahara et al. ........ | 312/406.2 |
| 5,592,719 A | * | 1/1997 | Eto et al. .................. | 24/297 X |
| 5,669,731 A | * | 9/1997 | Hironaka et al. ......... | 24/297 X |
| 5,758,987 A | * | 6/1998 | Frame et al. ............. | 24/297 X |
| 6,209,175 B1 | * | 4/2001 | Gershenson ................. | 24/297 |

FOREIGN PATENT DOCUMENTS

| | | | | |
|---|---|---|---|---|
| JP | 62105741 | * | 5/1987 | ................... 24/297 |
| JP | 02197787 | * | 8/1990 | ................. 312/400 |
| JP | 03013779 | * | 1/1991 | ................. 312/406 |
| JP | 05306881 | | 11/1993 | |
| JP | 08152255 | | 6/1996 | |
| JP | 09133456 | | 5/1997 | |

* cited by examiner

*Primary Examiner*—Lanna Mai
*Assistant Examiner*—Hanh V. Tran
(74) *Attorney, Agent, or Firm*—Wenderoth, Lind & Ponack, L.L.P.

(57) ABSTRACT

A heat-insulated housing for use in a refrigerator etc. includes a housing body having a rectangular opening in one side thereof, the opening having four corners each of which is defined by two side plates generally perpendicular to each other, either one of the side plates being formed with a hole having an engagement open edge, a corner cover including two closing plates disposed to be perpendicular to each other so as to have a generally L-shaped section, the closing plates having backs thereof abutting against the side plates of the housing body respectively, an engagement protrusion formed on the back of either closing plate abutting against the side plate formed with the hole, the protrusion being inserted into the hole of the side plate and elastically deformable, and a plurality of engaging teeth formed on the protrusion so as to be aligned in a direction of insertion of the protrusion, one of the teeth elastically engaging the opening edge of the hole when the protrusion is inserted into the hole.

8 Claims, 20 Drawing Sheets

CORNER COVER MOUNTING STRUCTURE FOR HEAT-INSULATED HOUSING FOR USE IN REFRIGERATOR

BACKGROUND OF THE INVENTION

1. Field of the invention

This invention relates generally to a heat-insulated housing used in refrigerators or the like, and more particularly to a structure for mounting corner covers on corners of an opening of such a heat-insulated housing.

2. Description of the prior art

A heat-insulated housing conventionally used in refrigerators or the like generally has an opening defined by an inwardly bent portion formed in an open edge of an outer box and an outwardly bent portion formed in an open edge of an inner box. The inner box is disposed inside the outer box so that the bent portions are opposed to each other. Decorative frames are then attached to the boxes so as to cover surfaces of the bent portions. A space between the outer and inner boxes is filled with a heat-insulating material such as a foaming resin. In order to prevent the space from varying due to a filling pressure, generally L-shaped reinforcing metal fixtures are fixed over both bent portions at corners of the opening respectively. When fixed to each opening corner, however, the reinforcing fixture blocks the decorative frames adjacent thereto such that ends of the frames cannot extend up to the corners. This results in a bad appearance. In view of the problem, generally L-shaped corner covers are mounted on the corners so as to cover the reinforcing fixtures respectively.

Japanese patent publication No. 8-152255A discloses a structure for mounting the corner covers of the type described above. In the disclosed mounting structure, a pair of elastic engagement protrusions are formed on the backside of one of two plate-shaped portions of a generally L-shaped corner cover. The paired protrusions have claws on distal ends respectively. Each reinforcing fixture has engagement through holes. The elastic protrusions are inserted into the respective holes so that the claws elastically engage edges of the holes respectively. As a result, the corner cover is prevented from falling off when mounted on the corner.

However, the elastic protrusions cannot always be inserted into the engagement holes of the reinforcing fixture by a constant depth. For example, when the covers are mounted after the space between the outer and inner boxes has been filled with the heat-insulating material, the depths of the inserted elastic protrusions sometimes differ depending upon the hardness of the heat-insulating material. Further, small screws are usually used to fix the reinforcing fixtures to the bent portions of the inner and outer boxes. Further, a moltprene tape is sometimes wound on the reinforcing fixtures to prevent leakage of the foaming resin. A fastening force of each screw and a winding force of the moltprene tape raise or lower the positions of the reinforcing fixtures relative to the bent portions. This also results in differences in the depths of the elastic protrusions inserted into the respective holes.

The conventional elastic protrusion is provided with only a single claw on the distal end thereof. Accordingly, in a case where the depths of the elastic protrusions inserted into the holes are not constant, as described above, the claw cannot engage the open edge of the hole when the elastic protrusion is inserted in a excessively shallow engagement hole. On the other hand, when the elastic protrusion is inserted in an excessively deep engagement hole, a gap is defined between the claw and the open edge of the hole. In both cases, the claw cannot desirably engage the open edge of the hole. Thus, the corner cover cannot reliably be mounted on the corner in the prior art.

SUMMARY OF THE INVENTION

Therefore, an object of the present invention is to provide a heat-insulated housing in which the corner cover is reliably engageable with the opening edge of the engagement hole to be mounted at each corner of the opening.

The present invention provides a heat-insulated housing comprising a housing body having a rectangular opening in one side thereof. The opening has four corners each of which is defined by two side plates generally perpendicular to each other. Either one of the side plates is formed with a hole having an engagement open edge. A corner cover includes two closing plates disposed to be generally perpendicular to each other so as to have a generally L-shaped section. The closing plates have backs thereof abutting against the side plates of the housing body respectively. An engagement protrusion is formed on the back of either closing plate abutting against the side plate formed with the hole. The protrusion is inserted into the hole of the side plate and elastically deformable. A plurality of engagement teeth are formed on the protrusion so as to be aligned in a direction of insertion of the protrusion. One of the teeth elastically engages the opening edge of the hole when the protrusion is inserted into the hole.

According to the above-described heat-insulating housing, the protrusion has a plurality of the engaging teeth formed thereon so as to be aligned properly. Accordingly, even when the protrusion is inserted into a hole having a different depth, any on of the teeth engages the opening edge of the hole. Consequently, the corner cover can reliably be mounted on the corner.

The protrusion preferably has a pointed distal end. For example, when the space between the outer and inner boxes is filled with a heat-insulating material before the mounting of the corner covers, the protrusion can smoothly be inserted into the hole, biting into the heat-insulating material.

The protrusion preferably includes an insertion body protruding from the closing plate and a flexible piece formed by folding a distal end of the insertion body, the teeth being formed on the flexible piece. For example, when supplied into the space after the corner covers have been mounted on the corners, the heat-insulating material enters a space between a root of the flexible piece and the insertion body. Consequently, the heat-insulating material serves to increase an engaging force of the corner cover.

The flexible piece preferably has a face on which the teeth are formed, the face being curved so that an amount of flexure of the flexible piece becomes approximately constant when each tooth engages the opening edge of the hole. The amount of flexure of the flexible piece is maintained approximately at a constant value over its length when the teeth sequentially engage the opening edge of the hole. Consequently, the corner cover can readily be mounted on the corner.

The flexible piece preferably includes a flexure limiting portion abutting against the insertion body of the protrusion to limit an amount of flexure developed in a direction in which the flexible piece comes close to the insertion body of the protrusion. The protrusion is inserted into the hole so that any one of the teeth engages the opening edge of the hole. The engagement of the teeth with the edge of the hole limits the flexure of the flexible piece toward the insertion body side. Consequently, the engaging force can be increased and the corner cover can be prevented from having lateral slippage in the hole.

A pair of the engagement protrusions are preferably provided on the backside of the closing plate of the corner cover so as to be spaced from each other with the teeth of the respective protrusions being directed outward, and the insertion bodies of the protrusions are connected by a connecting portion. Since a pair of the protrusions are provided, the corner cover can stably be engaged in a well-balanced state. Further, since the protrusions are connected to each other so as to be prevented from straddling outward, the protrusions can smoothly be inserted into the hole.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

Figure 1:
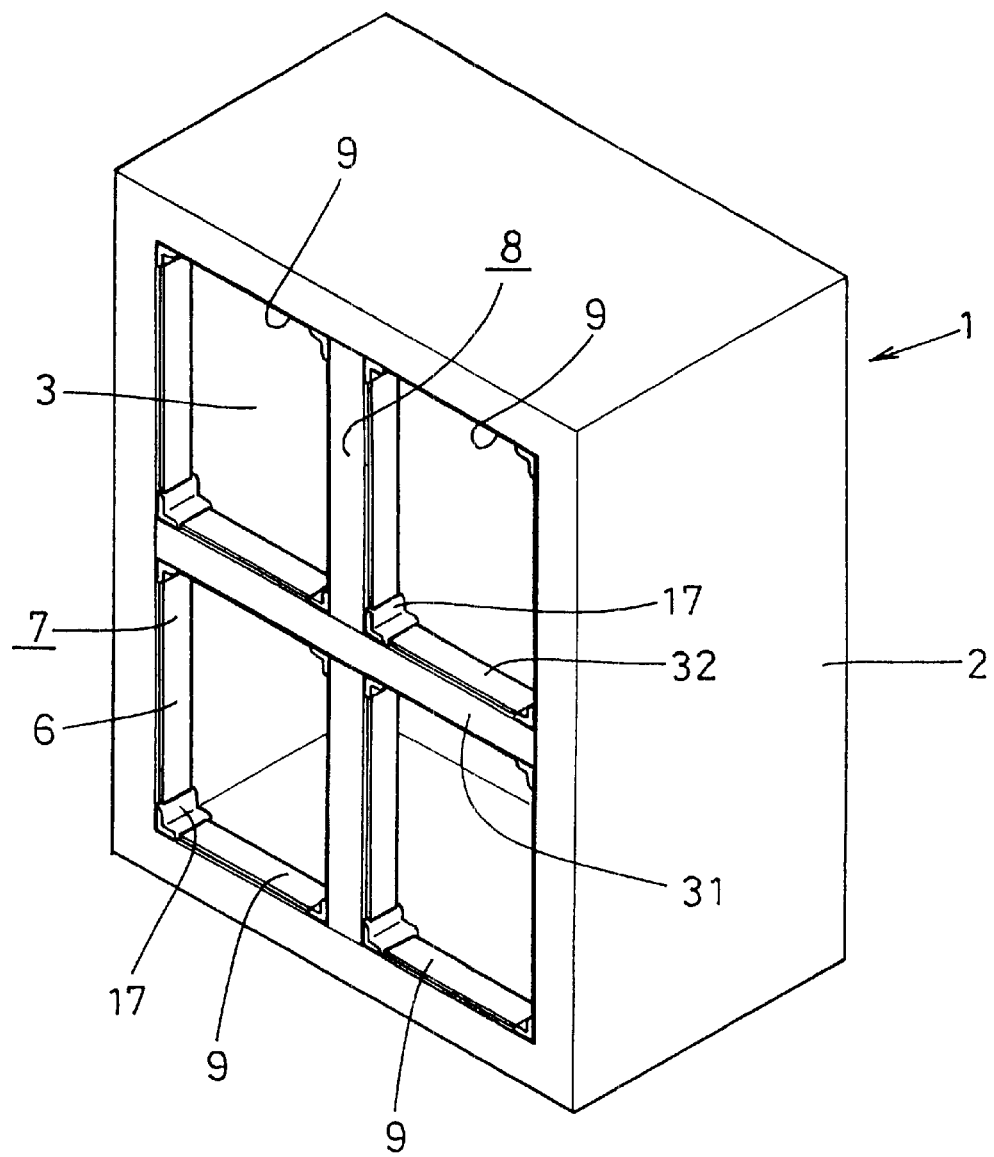
FIG. 1 is a perspective view of a heat-insulated housing of one embodiment in accordance with the present invention.

A first embodiment of the present invention will be described with reference to FIGS. 1 to 11. Referring to FIG. 1, a heat-insulated housing 1 constituting a refrigerator body is shown. The heat-insulated housing 1 comprises an outer box 2 having an open side and an inner box 3 also having an open side and disposed inside the outer box 2 with a predetermined space therebetween. The space between the outer and inner boxes 2 and 3 is filled with a heat-insulating material 4 (see FIG. 6) such as urethane foam. Decorative frames 6 extend over open edges of both boxes 2 and 3, thereby defining an opening 7. A generally cross-shaped heat-insulated partition frame 8 is fixed into the opening 7 so as to define four access openings 9 in the front of the heat-insulated housing 1. Corner covers 17 in accordance with the present invention are mounted on four corners of each access opening 9 respectively. Heat-insulated doors (not shown) are pivotally mounted on the heat-insulated housing 1 so as to close and open the respective openings 9.

Figure 2:
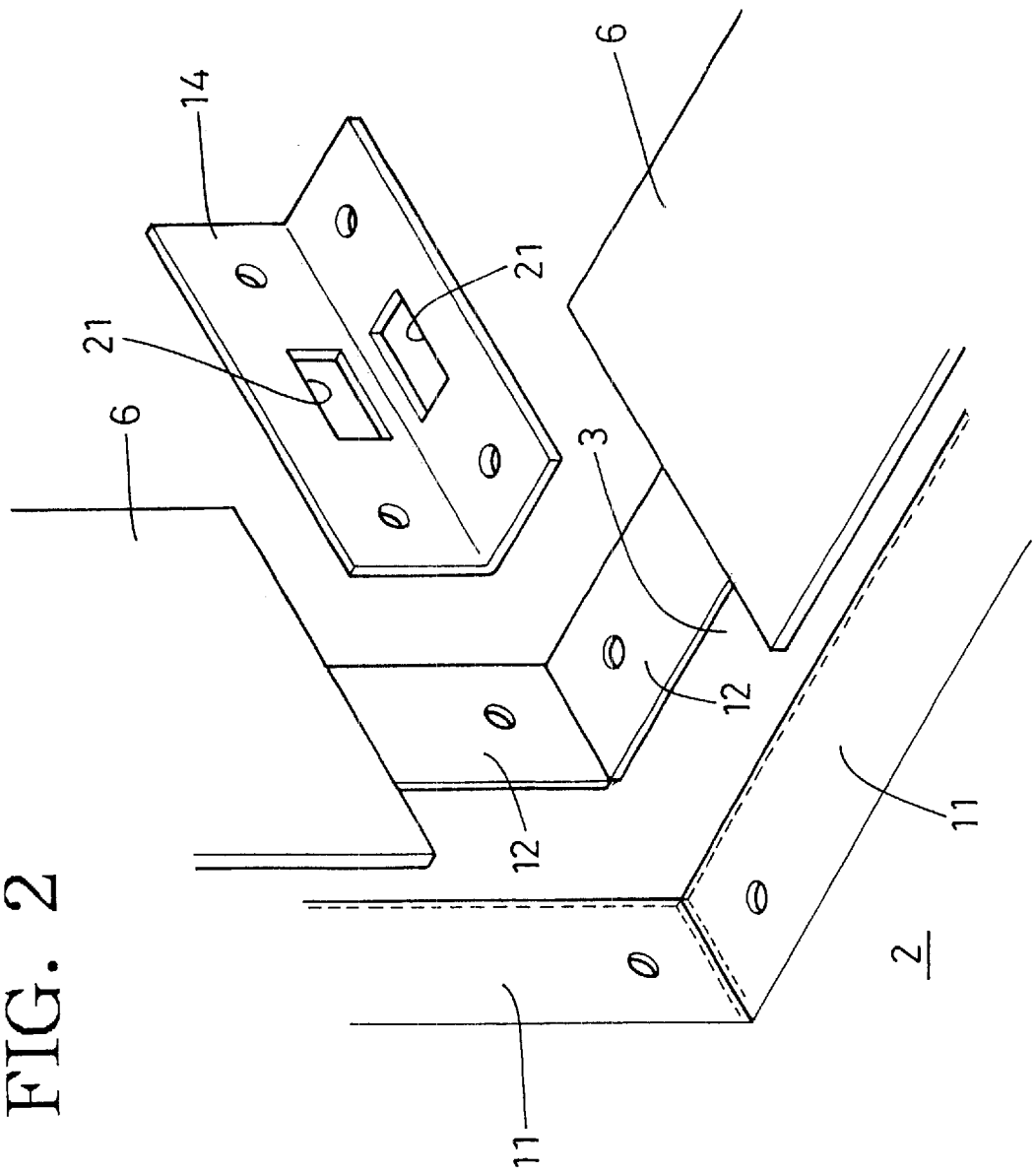
FIG. 2 is an exploded perspective view of one corner of an opening.
Figure 3:
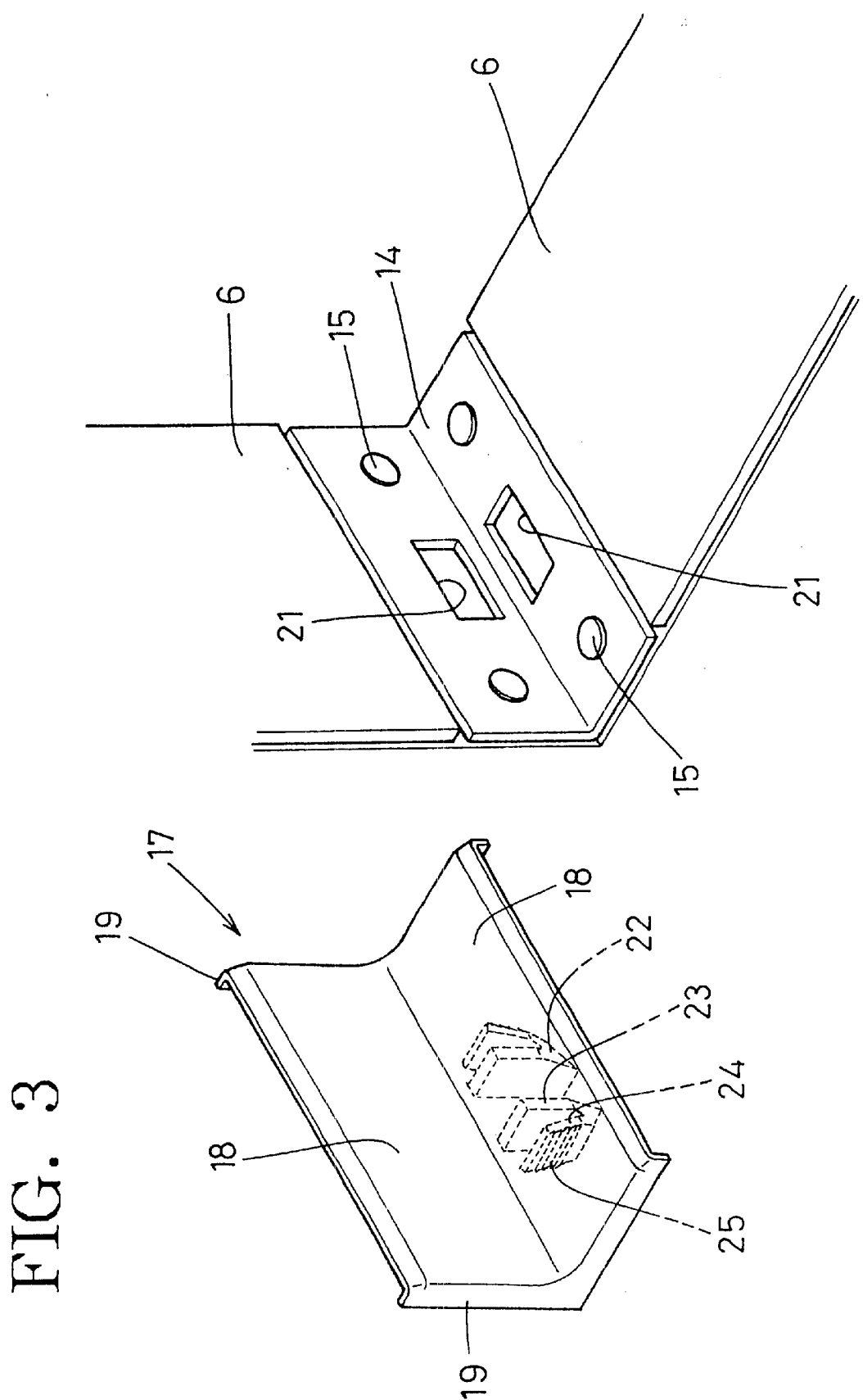
FIG. 3 is a perspective view of the corner and the corner cover before the mounting of the corner cover.

The following is the description of a case where the corner cover 17 is mounted on one of the corners of the lower left-hand access opening 9 as viewed in FIG. 1. At this corner, the outer box 2 has an inwardly bent portion 11 formed by bending an opening edge thereof inward at right angles, whereas the inner box 3 has an outwardly bent portion 12 formed by bending an opening edge thereof outward at right angles, as shown in FIG. 2. The inwardly and outwardly bent portions 11 and 12 are spaced from each other. A metal reinforcement 14 is mounted over both bent portions 11 and 12 in order that the space between the outer and inner boxes 2 and 3 may be prevented from varying due to a filling pressure when the space is filled with the heat-insulating material 4. The reinforcement 14 is formed by bending a metal plate so as to have a generally L-shaped section. The reinforcement 14 is fixed at four corners thereof to both bent portions 11 and 12 by fastenings 15 such as screws or rivets as shown in FIG. 3. The reinforcement 14 is positioned so as to be slightly retreated from the surface at an outer surface side of the heat-insulated housing 1 and planar with an inner surface of the heat-insulated housing 1. The decorative frames 6 are attached so as to cover surfaces of the bent portions 11 and 12 to which the reinforcement 14 is not mounted. A certain space is defined between the reinforcement 14 and an opposed end of each decorative frame 6 adjacent to the reinforcement.

A corner cover 17 is mounted so as to conceal the reinforcement 14. The corner cover 17 is made of a synthetic resin and includes two closing plate portions 18 formed at right angles to each other so as to have a generally L-shaped section, as shown in FIG. 3. The corner cover 17 has rounded corner portions at two sides thereof and two flanges 19 protruding from side edges of the closing plate portions 18 respectively. The flanges 19 are adapted to be fitted with side edges of the reinforcement 14 respectively.

Figure 8:
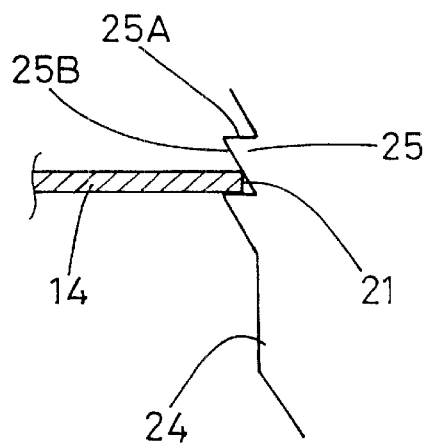
FIG. 8 is a partially sectional view of an engaging structure of engaging teeth.

The reinforcement 14 has two generally rectangular engagement holes 21 formed through vertical and horizontal portions thereof respectively. The hole 21 of the vertical portion of the reinforcement 14 may or may not be provided. On the hand, the corner cover 17 has a pair of engagement protrusions 22 formed on the backside of the horizontal closing plate portion 18 thereof. Each protrusion 22 includes an insertion body 23 protruding from the closing plate portion 18 and a flexible piece 24 extending outside from a distal end of the insertion body 23 toward a root of the insertion body. The flexible piece 24 has a plurality of engaging teeth 25 formed on a portion thereof ranging between a central portion and a distal end. Each engaging tooth 25 is formed in a saw-tooth shape and includes an upper engaging side 25A and a lower inclined guide side 25B as shown in FIG. 8.

Figure 4:
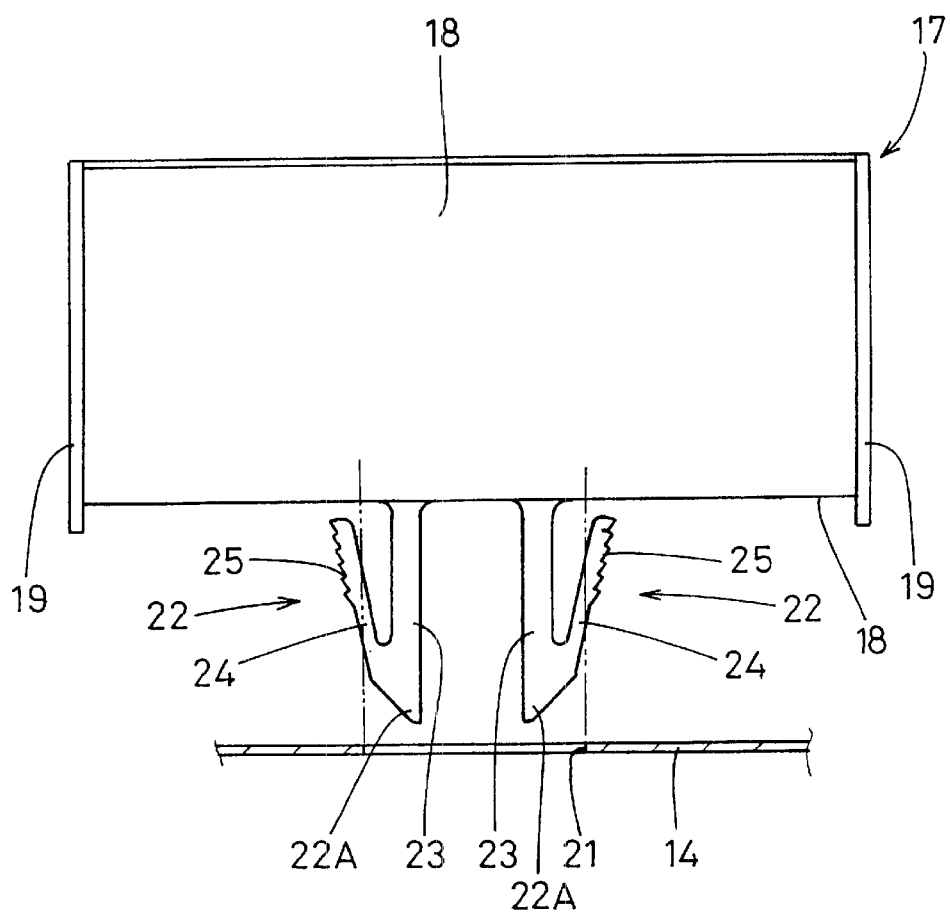
FIG. 4 is a sectional view showing the relationship between an engaging pros ion of the corner cover and an engagement hole.
Figure 5:
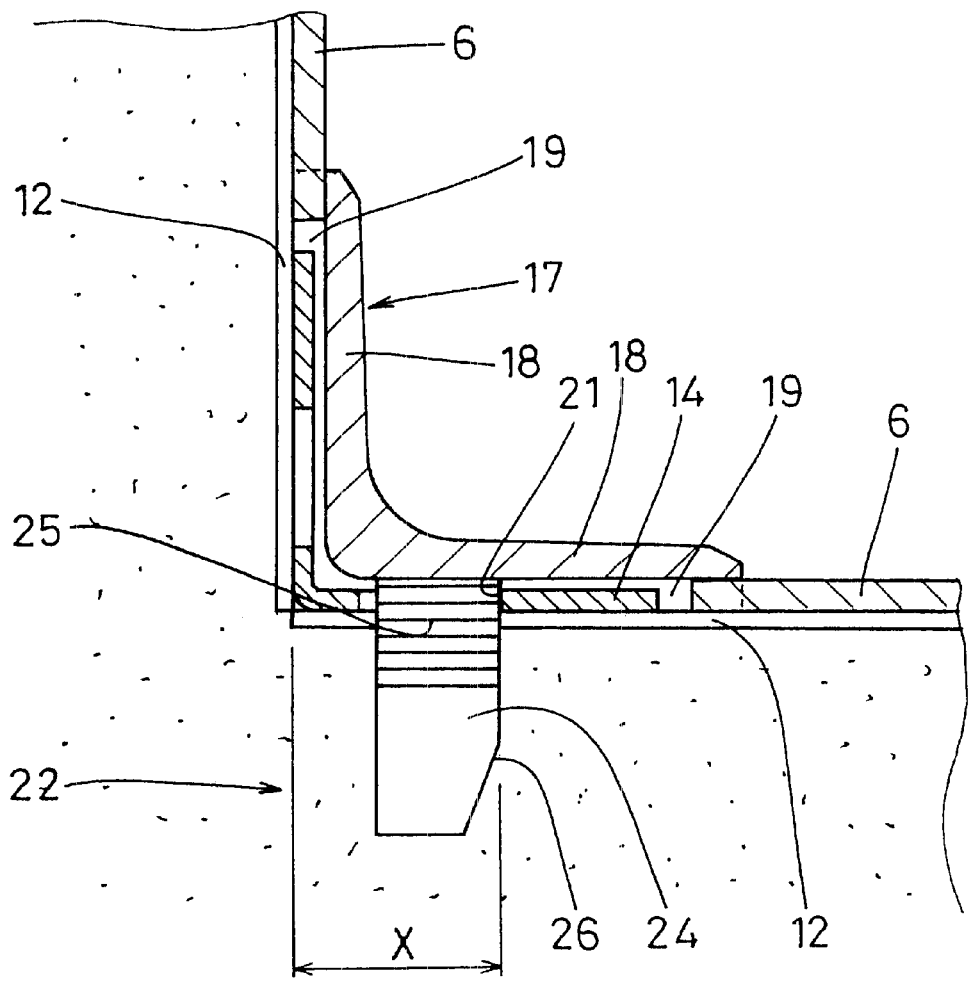
FIG. 5 is a longitudinal section of the corner.

The paired engagement protrusions 22 are formed on the corner cover 17 to be symmetrically spaced from each other with the respective flexible pieces 24 being located outside. Each protrusion 22 has an acutely pointed distal end 22A. A distance between lower end positions of the engaging teeth 25 of the respective protrusions 22 is set to be substantially equal to the dimension of a long side of the engagement hole 21 when both protrusions are in a natural state as shown in FIG. 4. Each protrusion 22 has a depth set to be slightly smaller than the dimension of a short side of the hole 21 as shown in FIG. 5. Reference symbol X in FIG. 5 designates a dimension between the front of the protrusion 22 (the right-hand side as viewed in FIG. 5) and an innermost edge of the flange 19 of the vertical closing plate 18. The dimension X is set to be equal to a dimension between the front edge of the hole 21 and the surfaces of the vertical bent portions 11 and 12. Each protrusion 22 has a tapered guide face 26 formed on the front lower end thereof.

The procedure for mounting the corner cover 17 will now be described. The inner box 3 is put into the outer box 2, and the reinforcements 14 are mounted over both bent portions 11 and 12 at the respective corners of the opening 7 in the manner as described above. On this occasion, a moltprene tape is wound on each reinforcement 14 so that the heat-insulating material 4 is prevented from leaking through the hole 21 during the filling step. A seal tape may be used instead of the moltprene tape or both the moltprene tape and the seal tape may be used together. The decorative frames 6 are then attached so as to cover the surfaces of the bent portions 11 and 12 to which the reinforcement 14 is not mounted.

Figure 6:
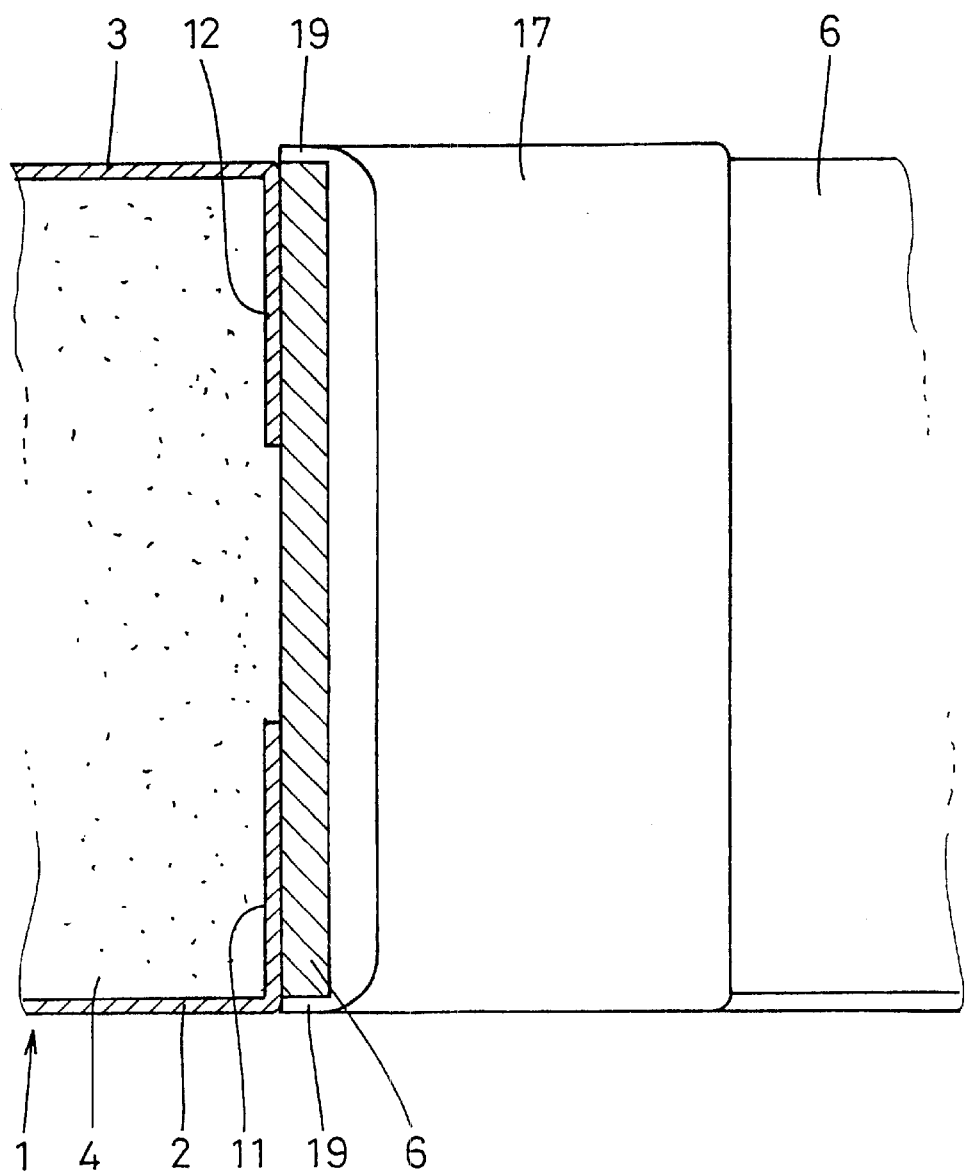
FIG. 6 is an transverse section of the corner.
Figure 7:
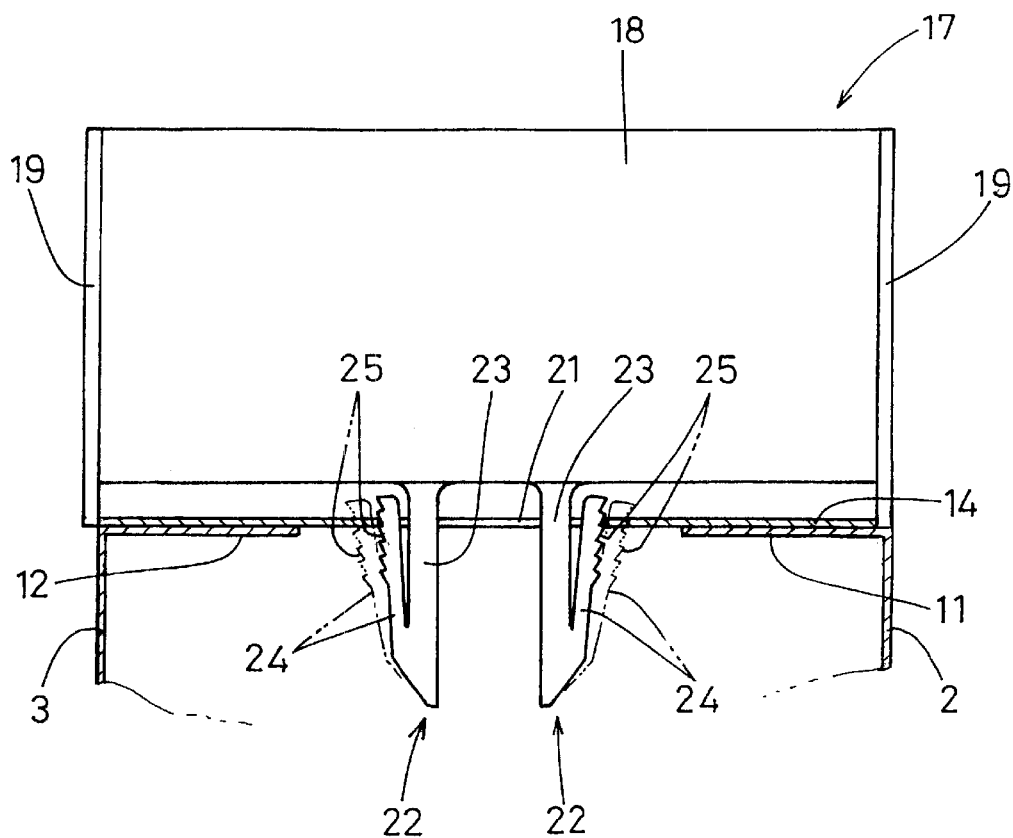
FIG. 7 is a view showing the corner cover being mounted.

The corner cover 17 is then mounted. The paired protrusions 22 are inserted into the respective holes 21 with the flange 19 of the vertical closing plate 18 being moved along the vertical bent portions 11 and 12. The guide faces 26 of the protrusions 22 abut against the right-hand edges of the respective holes 21 in FIG. 5 such that the corner cover 17 is positioned back and forth (rightward and leftward in FIG. 5). When the protrusions 22 are inserted into the respective holes 21, the inclined guide faces 25B of the engaging teeth 25 of the respective protrusions 22 sequentially engage the opening edges of the holes 21, so that the flexible pieces 24 are pushed into, flexing so as to come close to the bodies 23, as shown in FIG. 7. When the corner cover 17 is pushed until abutting against the horizontal bent portions 11 and 12, the teeth 25 of the protrusions 21 elastically engage the opening edges of the holes 21 respectively. More specifically, with the flexure of the flexible pieces 24, the engaging faces 25A of the teeth 25 each assuming a substantially horizontal state engage the lower opening edges of the holes 21 respectively, whereupon the corner cover 17 is mounted so as to be prevented from falling off, as shown in FIG. 8. The front side of the corner cover 17 is planar with the front of the heat-insulated housing 1 as shown in FIG. 6. Accordingly, a packing provided along the peripheral edge of the backside of the heat-insulated door for the access opening 9 can be pressed closely against the overall front peripheral edge of the access opening 9 including the corners, whereby leakage of cold air can reliably be prevented.

When all the corner covers 17 are mounted in the manner as described above, the heat-insulating material 4 is supplied through an inlet (not shown) formed in a suitable portion of the outer box 2 into the space between the outer and inner boxes 2 and 3 so that the space is filled with the heat-insulating material. Thereafter, the inlet is closed and the manufacturing of the heat-insulated housing 1 with the corner covers 17 mounted on the corners of the opening 7 is completed.

According to the above-described embodiment, each engagement protrusion 22 has a row of engaging teeth 25. Any one tooth of each protrusion 22 engages the engagement hole 21 even when the depths of the protrusions 22 differ due to an error in the position of the reinforcement 14. Consequently, the corner cover 17 can reliably be mounted. Further, when the space between the outer and inner boxes 2 and 3 is filled with the heat-insulating material 4, the material flows to the space between the curved flexible piece and the body 23 of each protrusion 22 such that the corner cover 17 can further be prevented from falling off.

Although the space between the outer and inner boxes 2 and 3 is filled with the heat-insulating material 4 after the mounting of the corner covers 17, the corner covers 17 may be mounted after the space is filled with the heat-insulating material 4, instead. In this case, the protrusions 22 are put into the previously supplied heat-insulating material 4 and inserted into the respective holes 21. Since the distal end 22A of each protrusion 22 is acutely pointed, each protrusion 22 can smoothly be inserted into the hole 21, gnawing into the heat-insulating material 4.

For example, the lower left-hand corner of the upper right-hand access opening 9 in FIG. 1 is formed by the cross-shaped partition frame 8. In this case, the corner cover 17 is mounted to the corner without attaching the reinforcement 14 thereto.

Figure 9:
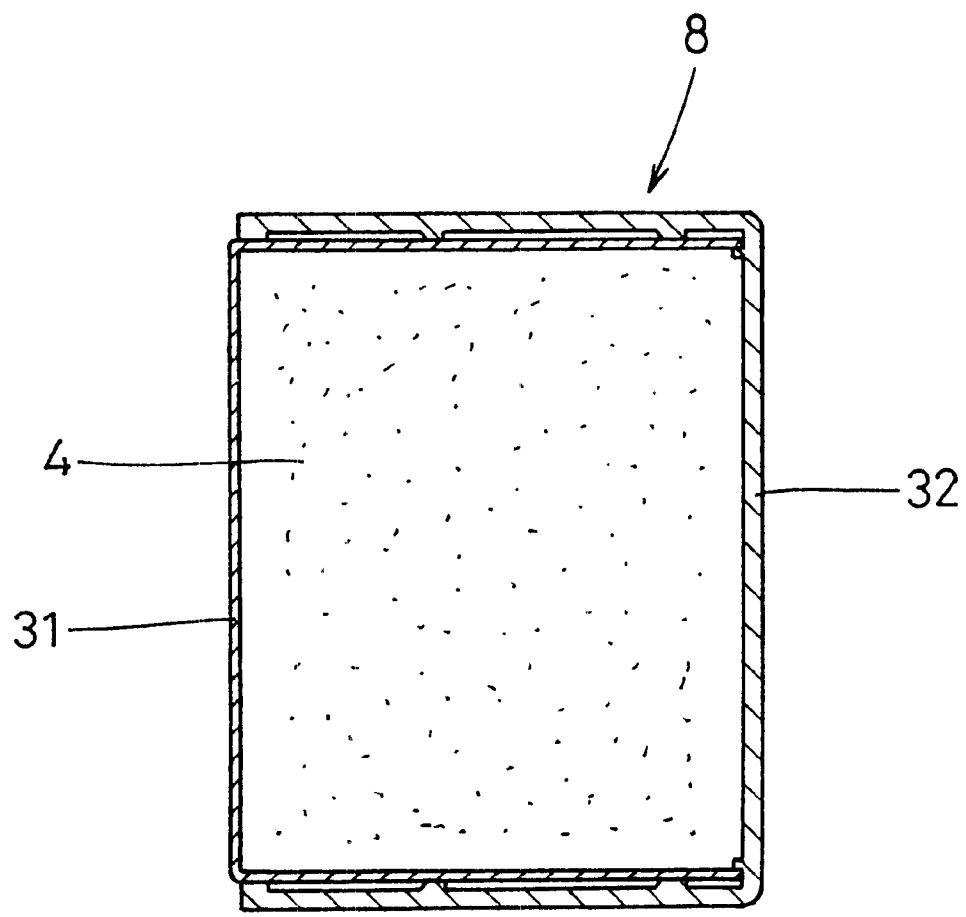
FIG. 9 is a sectional view of a partition frame.
Figure 10:
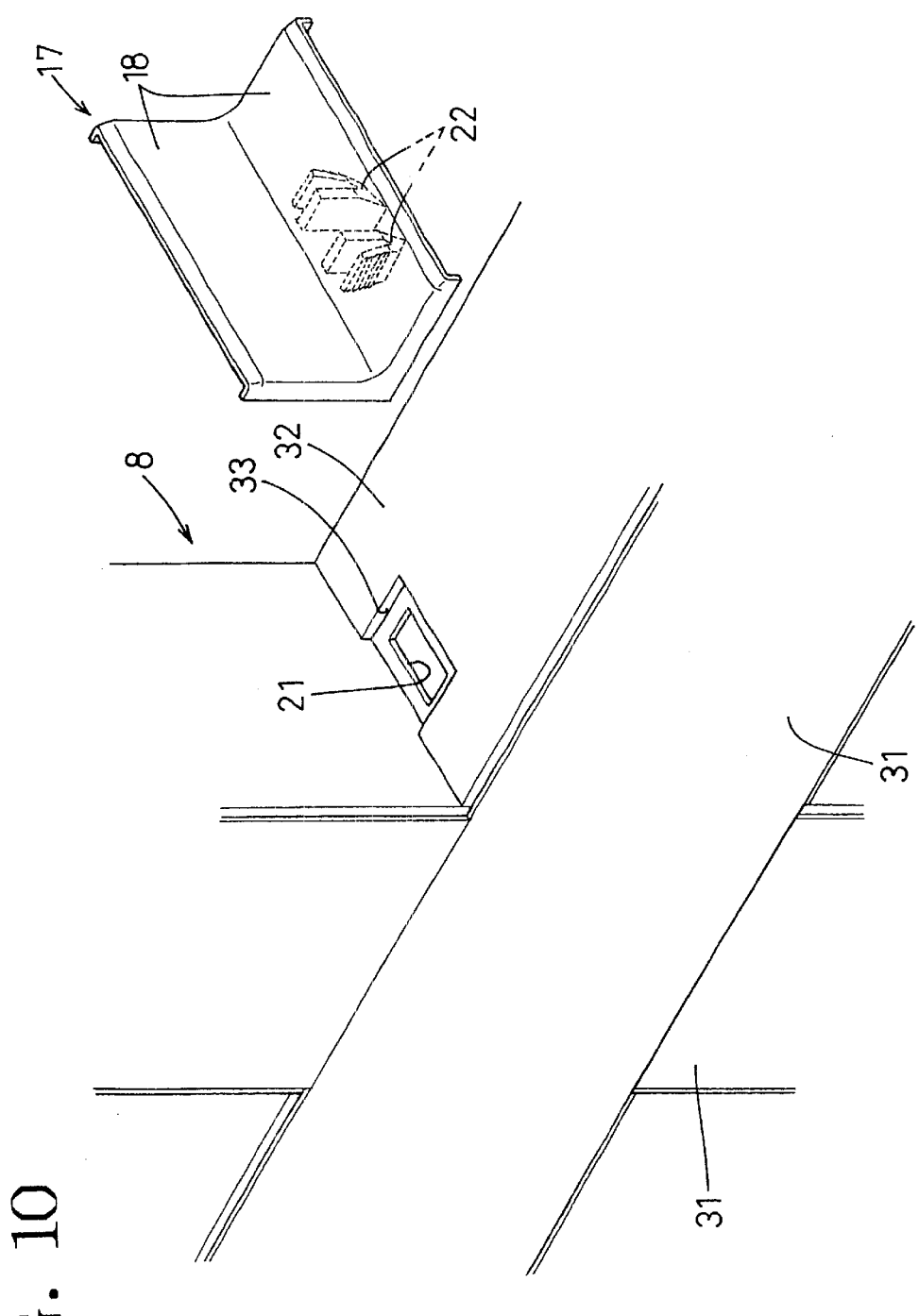
FIG. 10 is perspective view of a corner of the partition wall and the corner cover, showing the condition before the mounting of the corner cover.
Figure 11:
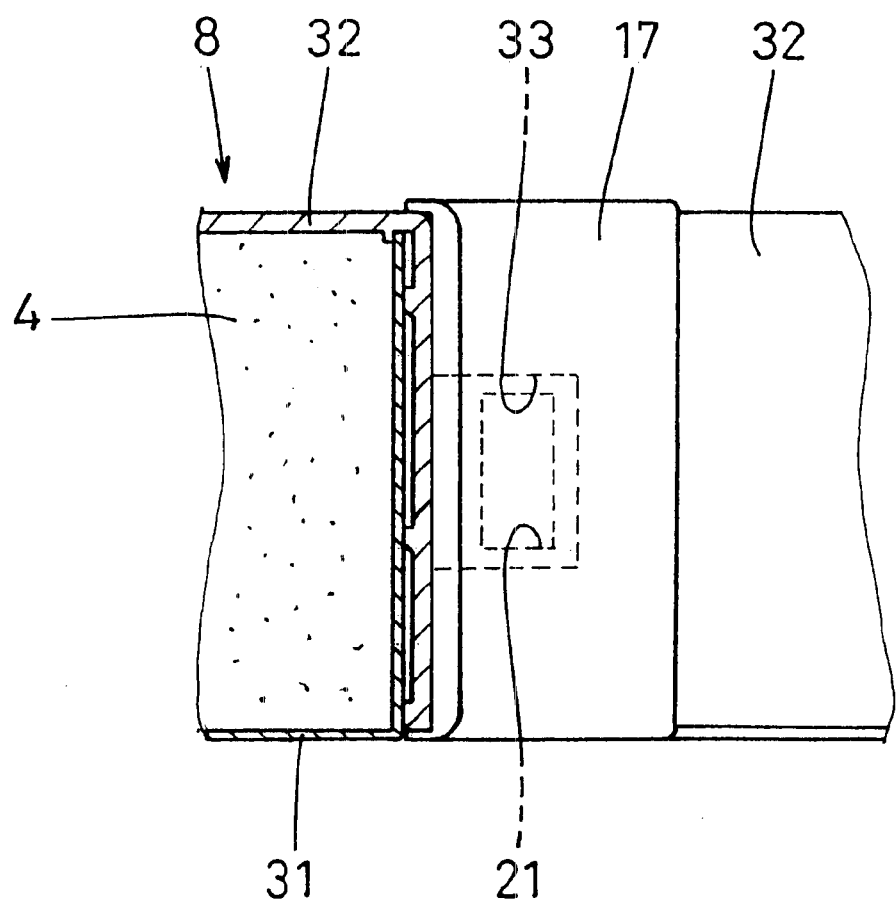
FIG. 11 is a transverse section of the corner of the partition wall.

The partition frame 8 comprises a metal front frame 31 having a rear opening and a generally U-shaped section and a decorative frame 32 made of a synthetic resin and having a front opening as shown in FIG. 9. The decorative frame 32 is slightly larger than the front frame 31 and also has a generally U-shaped section. The decorative frame 32 is fitted with the front frame 31 from the rear of the latter, and an inner space is filled with the heat-insulating material 4. The partition frame 8 has a portion corresponding to the corner of the access opening 9. At this portion, the horizontal decorative frame 32 has a notch 33, and the front frame 31 located under the decorative frame 32 has an engagement hole 21 which is the same as that of the reinforcement 14, as shown in FIG. 10. While the vertical closing plate 18 of the corner cover 17 is moved along the vertical portion of the partition frame 8, the engagement protrusion 22 is inserted through the notch 33 into the hole 21, so that the corner cover 17 is attached to the corner (FIG. 11).

Figure 12:
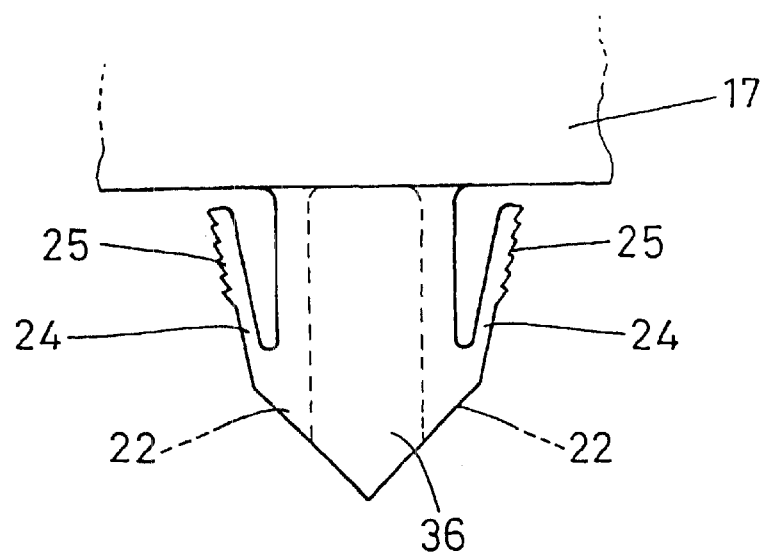
FIG. 12 is a partial front view of a modified form of the corner cover.

FIG. 12 shows a modified form of the corner cover 17. The right and left engagement protrusion 22 are integrated by a solid portion 36. The solid portion 36 has an acutely pointed distal end.

Figure 13:
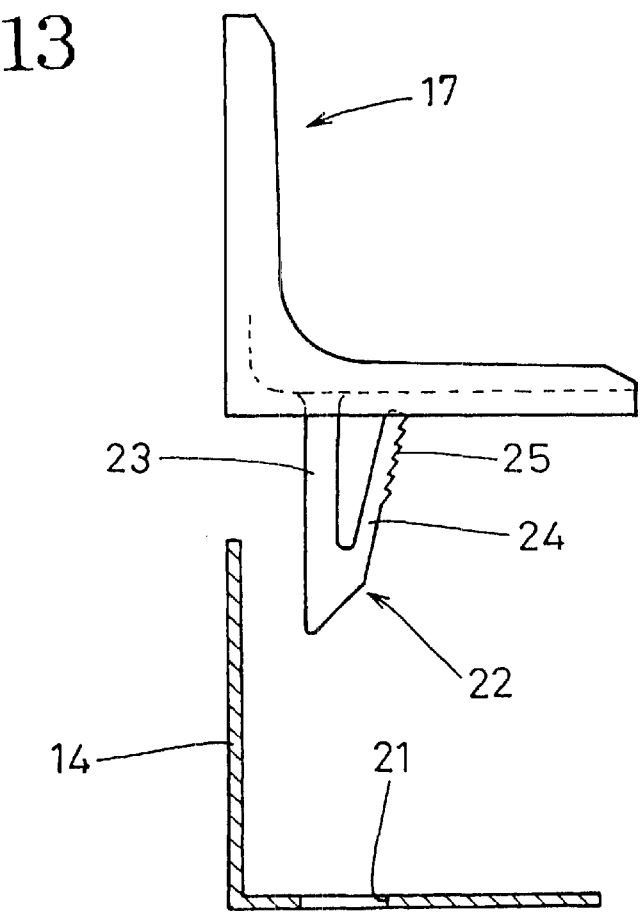
FIG. 13 is a partially sectional side view of a reinforcing fixture and another modified form of the corner cover being mounted.

FIG. 13 shows another modified form of the corner cover 17. The corner cover 17 has a single engagement protrusion 22. In this case, the protrusion 22 is formed so that the insertion body 23 thereof abuts against one of the two long sides of the hole 21 and the engaging tooth 25 engages the edge of the other long side of the hole 21.

Figure 14:
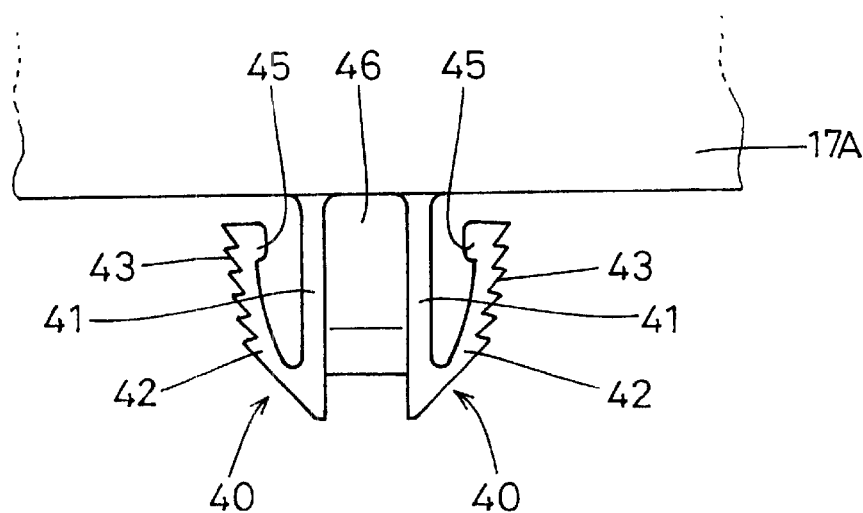
FIG. 14 partial front view of the corner cover used in the heat-insulated housing of a second embodiment in accordance with the invention.
Figure 15:
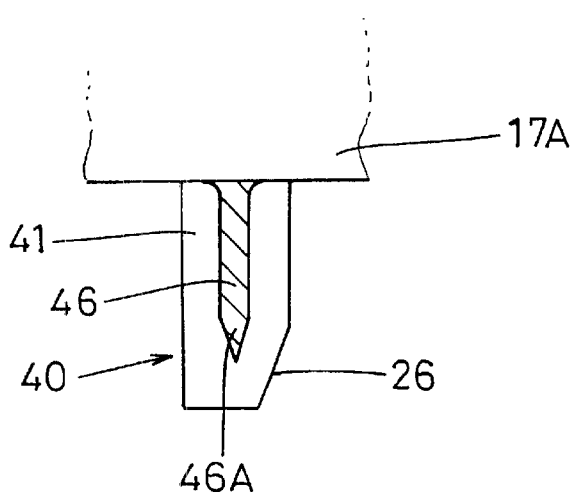
FIG. 15 is a sectional view of the corner cover.
Figure 16:
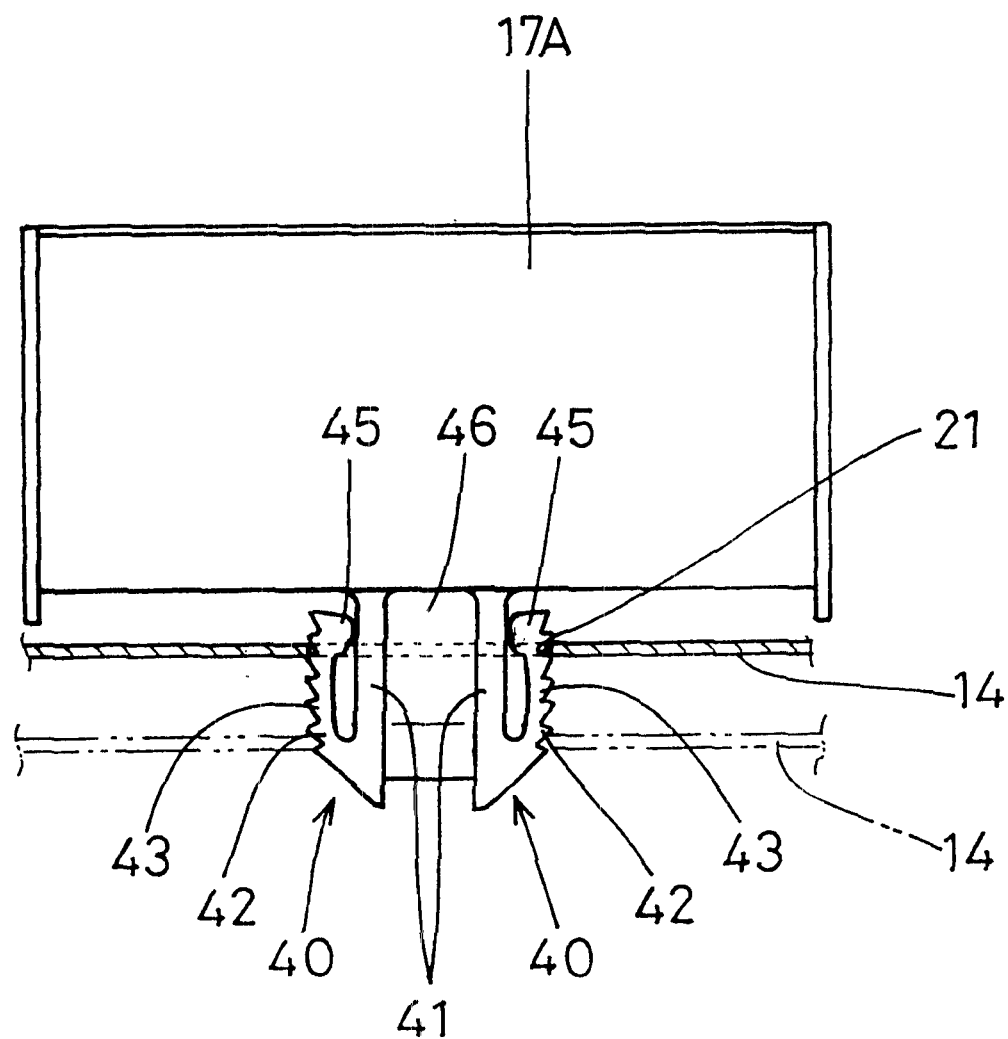
FIG. 16 is a partially sectional side view of the corner cover being mounted on the reinforcing fixture.

FIGS. 14 to 16 illustrate a second embodiment of the invention. The second embodiment differs from the first embodiment in the shape of each engagement protrusion 22. In the first embodiment, the face of the flexible piece 24 on which the engaging teeth 25 are formed extends linearly so as to spread outward successively as it goes upward. On the other hand, in each engagement protrusion 40 in the second embodiment, a face of each flexible piece 42 on which the engaging teeth are formed is curved so that the upper end thereof comes close to the insertion body 41. Further, each flexible piece 42 has a distal end formed with a protrusion 45 on an inside face thereof. The protrusion 45 is adapted to abut against the insertion body 41. Additionally, a connecting plate 46 is provided to connect the insertion bodies 41 of the respective protrusions 40. The connecting plate 46 has a lower end 46A which is pointed as shown in FIG. 15. The other structure in the second embodiment is the same as that in the first embodiment. Accordingly, the description of the other structure is eliminated, and the identical or similar parts in the second embodiment are labeled by the same reference symbols as those in the first embodiment.

In mounting the corner cover 17A in the second embodiment, the paired engagement protrusions 40 are inserted into the engagement hole 21 of the reinforcement 14 or of the front frame 31 of the partition frame 8. The protrusions 40 are connected to each other by the connecting plate 46 to thereby be prevented from straddling outward when being inserted into the engagement hole 21. Accordingly, the inserting work can smoothly be carried out since the protrusions 40 can be prevented from being displaced out of the hole 21. Further, the lower end 46A of the connecting plate 46 is pointed. Consequently, even when the corner cover 17 is mounted on the corner after the space between the outer and inner boxes has been filled with the heat-insulating material 4, the protrusions 40 can smoothly be inserted into the hole 21 with the connecting plate 46 biting into the heat-insulating material 4.

Further, since the face of each flexible piece 42 on which the engaging teeth 43 are formed is curved, an amount of flexure of each flexible piece 42 is kept substantially constant over a length thereof while the corner cover 17A is inserted into the hole 21 so that the engaging teeth 43 successively engage the opening edge, as shown in FIG. 16. Consequently, the corner cover 17A can easily be inserted.

Further, upon completion of insertion of the corner cover 17A, the protrusions 45 of the flexible pieces 42 come closer to the insertion bodies 41 respectively, as shown in FIG. 16. Accordingly, after the mounting of the corner cover 17A, the protrusions 45 abut against the respective insertion bodies 41 such that the flexure of the flexible pieces 42 is limited. Consequently, the engaging force of the corner cover 17A can be increased, and its slippage in the hole 21 can also be limited.

Figure 17:
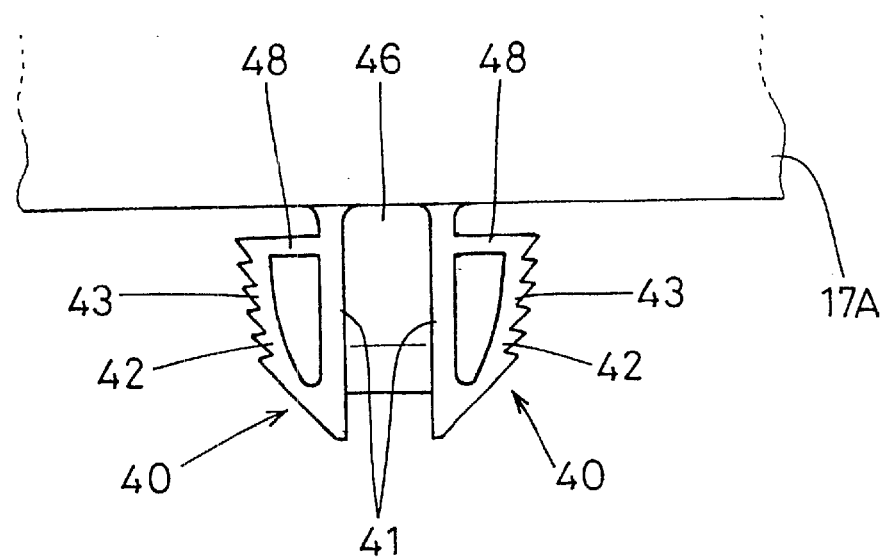
FIG. 17 is a partial front view of a modified form of the corner cover.
Figure 18:
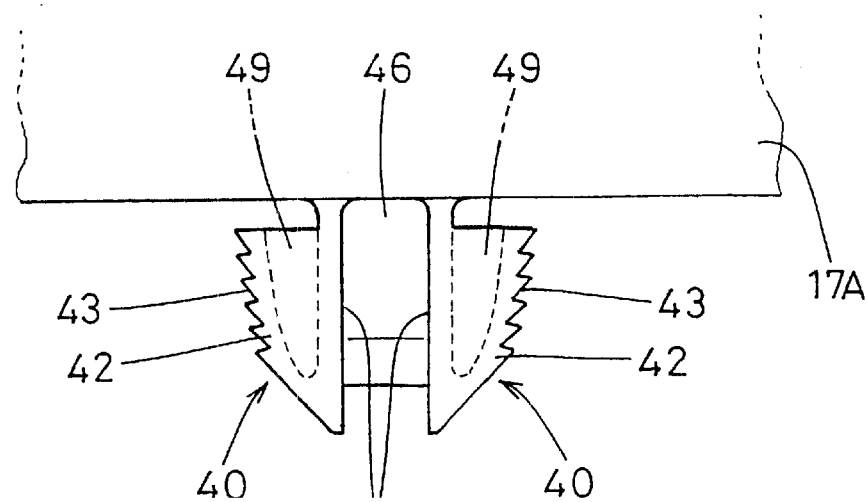
FIG. 18 is a partial front view of another modified form of the corner cover.

As the means for limiting the flexure of the flexible piece 42, a rib 48 may be provided for connecting the insertion body 41 to the extending end of the flexible piece 42 as shown in FIG. 17. Further, a solid portion 49 may be provided for occupying the space between the insertion body 41 and the flexible piece 42 as shown in FIG. 18.

FIGS. 19 to 24 illustrate a third embodiment. In the third embodiment, means is provided for preventing leakage of the heat-insulating material out of the corners of the opening in manufacturing the heat-insulated housing. The third embodiment differs from the foregoing first embodiment in that an air-impermeable sheet is attached to the backside of the reinforcement. The other construction in the third embodiment is the same as that in the first embodiment. Accordingly, identical or similar parts in the third embodiment are labeled by the same reference symbols as those in the first embodiment and the description of these parts is eliminated.

Figure 19:
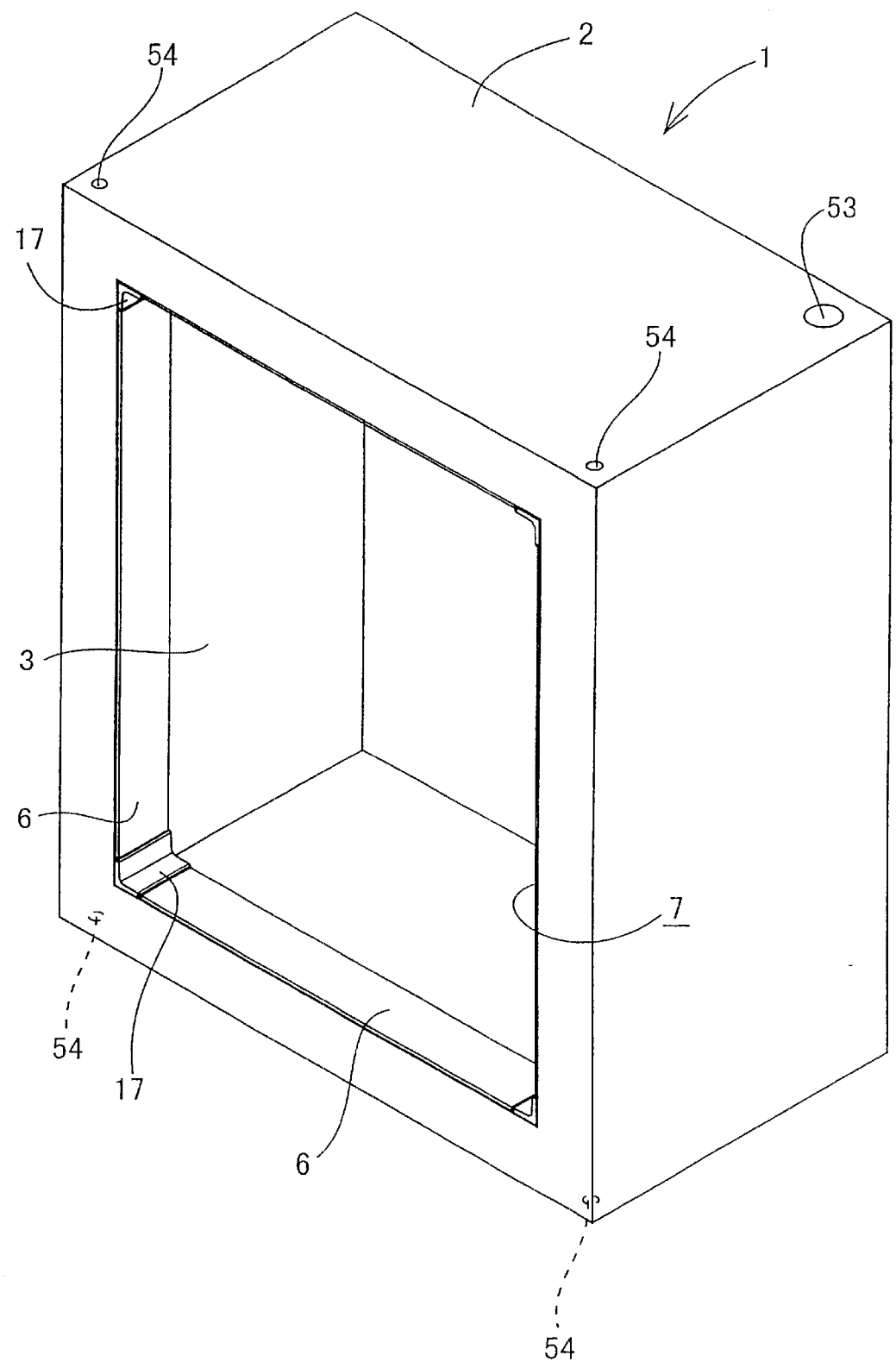
FIG. 19 is a perspective view of the heat-insulated housing of a third embodiment in accordance with the invention.
Figure 20:
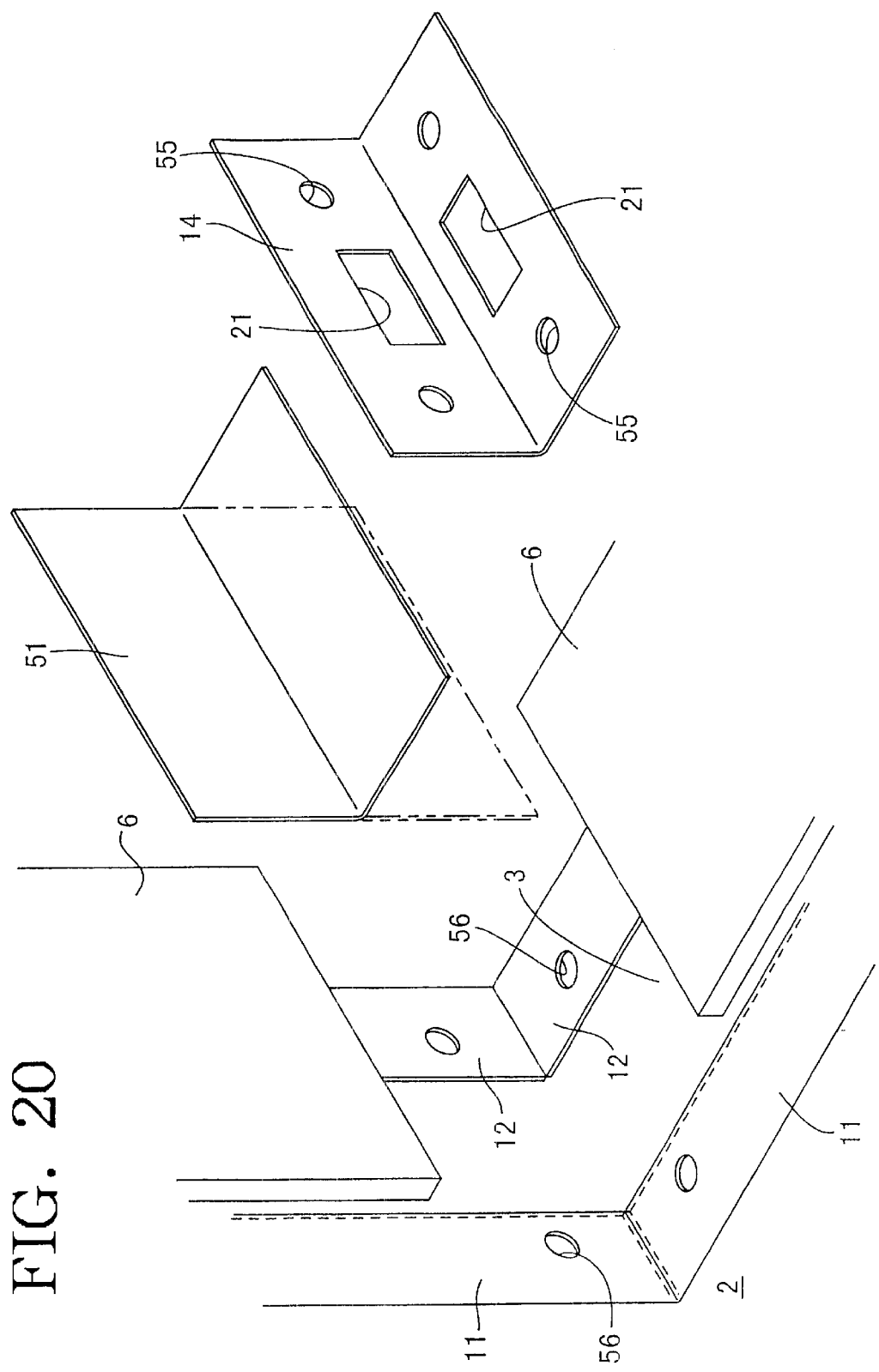
FIG. 20 is an exploded perspective view of one corner of the opening of the heat-insulated housing.
Figure 21:
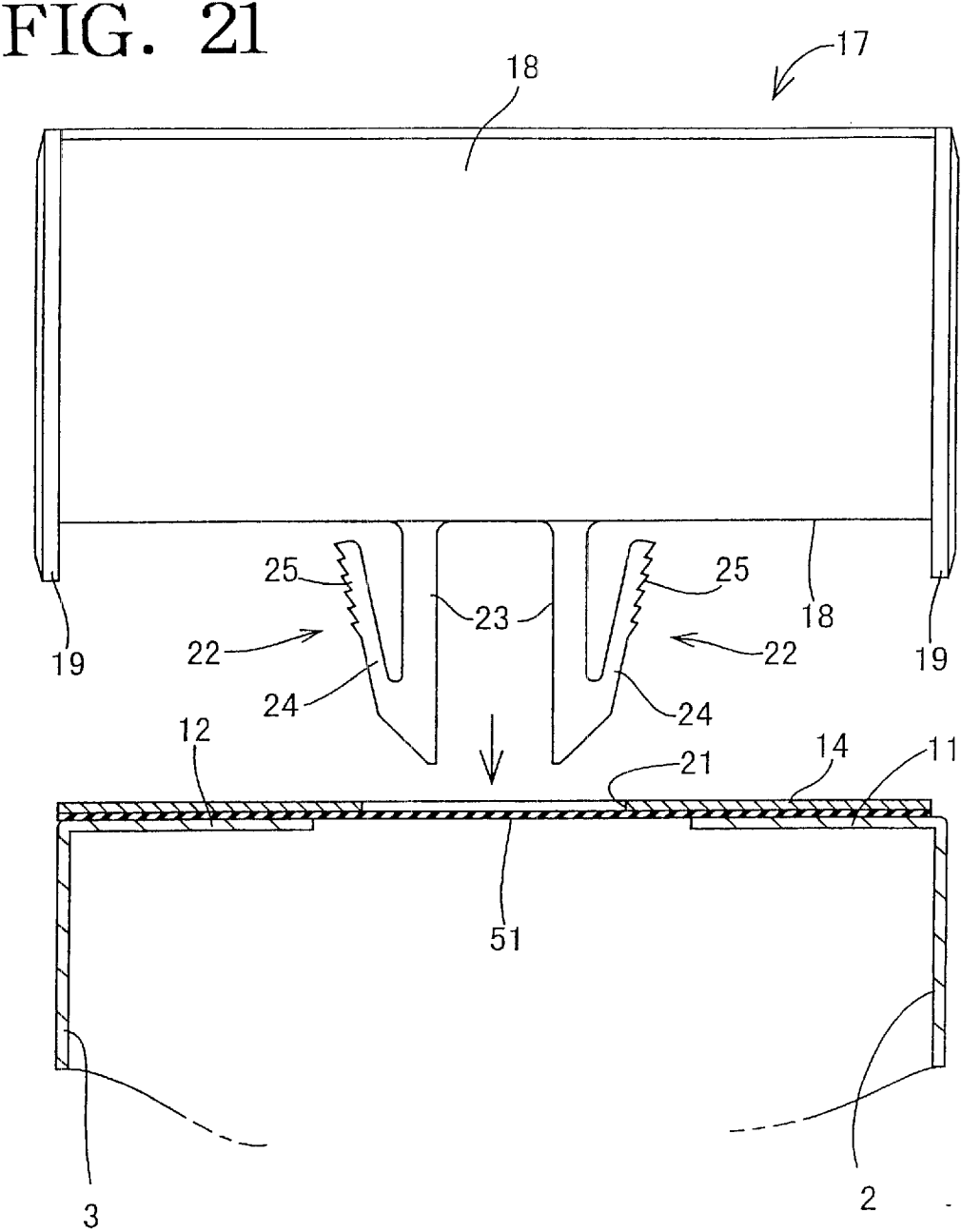
FIG. 21 is a sectional view of the corner and the corner cover before the mounting of the corner cover.

A sponge rubber sheet 51 is attached to the backside of the reinforcement 14. Ethylene propylene dien monomer (EPDM) which is a foaming synthetic rubber is suitable for the material of the sponge rubber sheet 51. EPDM has a closed cell structure and air-impermeability. EPDM further has good elasticity, heat-insulation and weather proof properties. The sponge rubber sheet 51 is bent and then affixed to the backside of the reinforcement 14 as shown in FIG. 20. The sponge rubber sheet 51 has a width approximately equal to a width of the reinforcement 14 and such a larger length that the sheet projects slightly from the lengthwise edges of the horizontal and vertical portions of the reinforcement 14. The ceiling of the outer box 2 has in right-hand rear end thereof an inlet 53 through which the foaming heat-insulating material 4 is poured as shown in FIG. 19. The ceiling of the outer box 2 further has two small gas vent holes 54 in the right-hand and left-hand ends thereof respectively. Furthermore, the bottom of the outer box 2 has two small gas vent holes 54 in the right-hand and left-hand ends thereof respectively.

Figure 23:
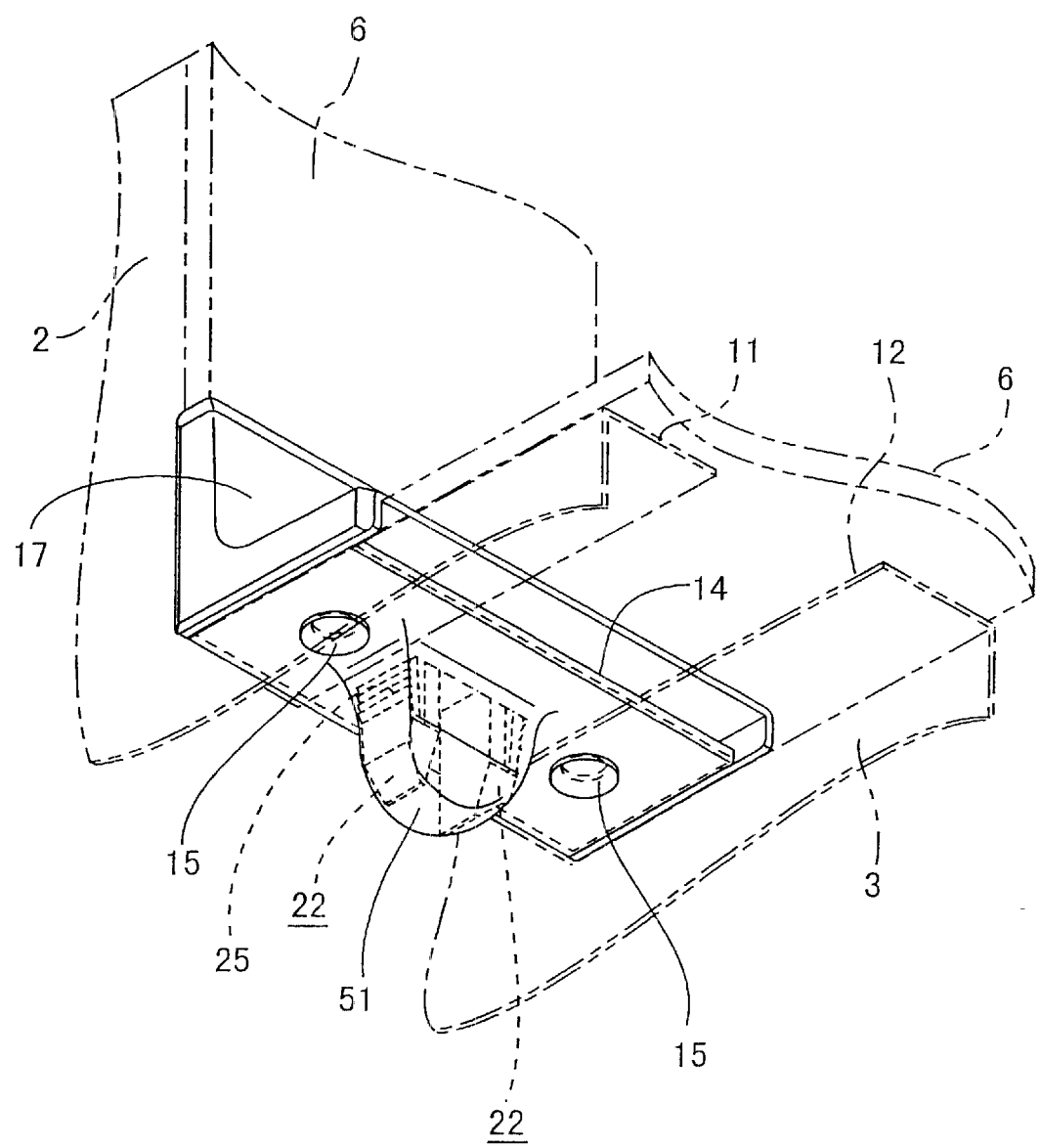
FIG. 23 is a perspective view of the corner cover mounted on the corner, as viewed from the back thereof.

The procedure for manufacturing the heat-insulated housing 1 of the third embodiment will now be described. The inner box 3 is first put into the outer box 2. The decorative frames 6 are attached to the boxes so as to cover the surfaces of the bent portions except the corners of the opening 7. The reinforcements 14 are then mounted to the corners of the opening 7 respectively. In this case, the sponge rubber sheet 51 is previously affixed to the backside of each reinforcement 14. Each reinforcement 14 with the sheet 51 on the backside thereof is applied to the corresponding corner. Four rivets 15 are driven through respective rivet holes 55 of the reinforcement 14 and the sponge rubber sheet 51 as shown in FIG. 23. The rivets 15 are further driven through rivet holes 56 of the inwardly bent portion 11 of the outer box 2 and the outwardly bent portion 12 of the inner box 3. As a result, the reinforcement 14 is fixed with the sheet 51 being held between both bent portions 11 and 12 and the reinforcement. A gap between the edges of both bent portions 11 and 12 is closed at the surface side by the sheet 51. Further, the engagement hole 21 of the reinforcement 14 is also closed at the backside by the sheet 51. Additionally, portions of the sheet 51 projecting from the opposed ends of the reinforcement 14 are bent to thereby close gaps between the decorative frames 6 and the opposed ends of the reinforcement respectively. Thus, all the possible gaps at the corner of the opening 7 are closed by the sponge rubber sheet 51.

Figure 22:
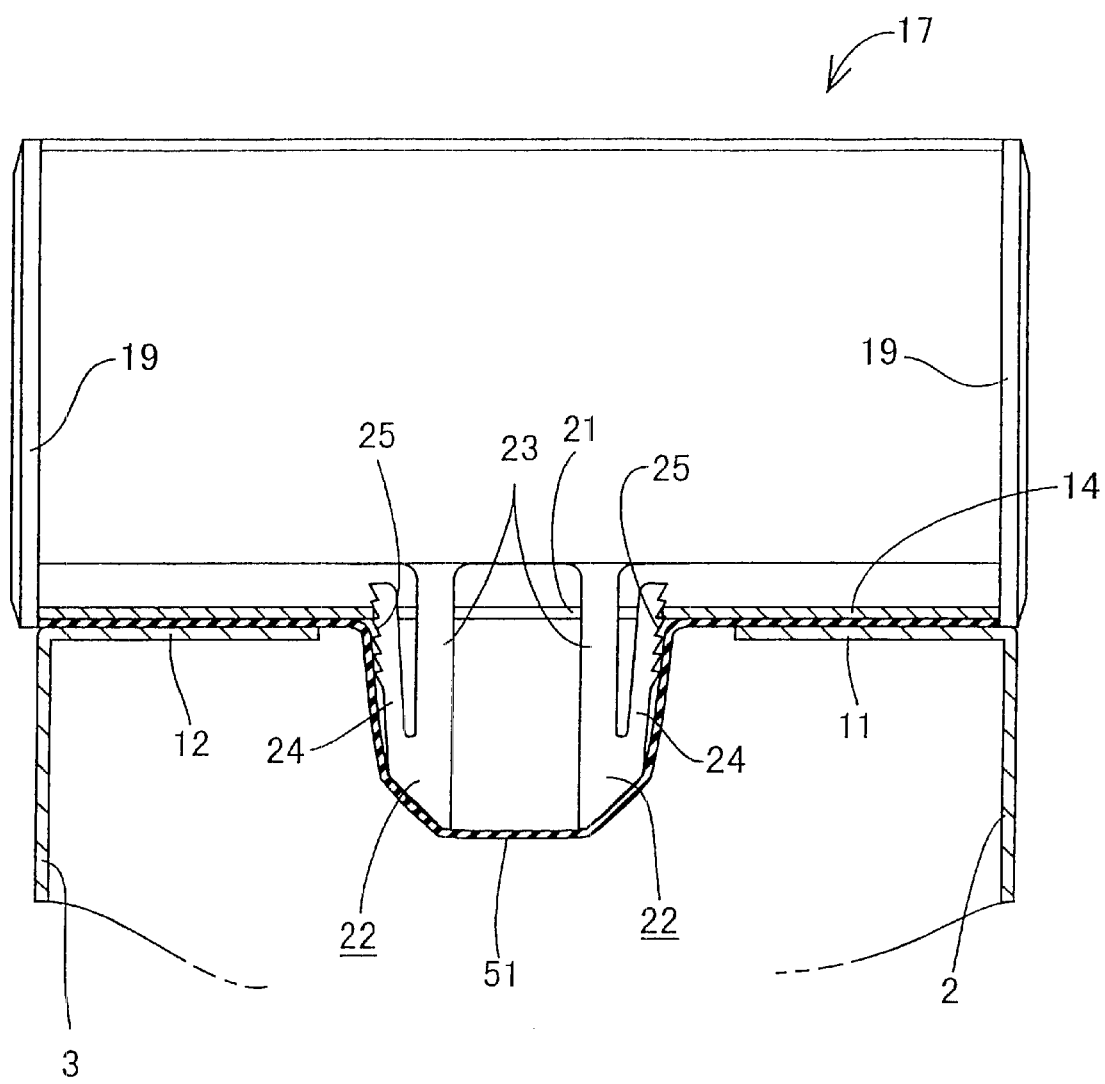
FIG. 22 is a sectional view of the corner and the corner cover after the mounting of the corner cover.
Figure 24:
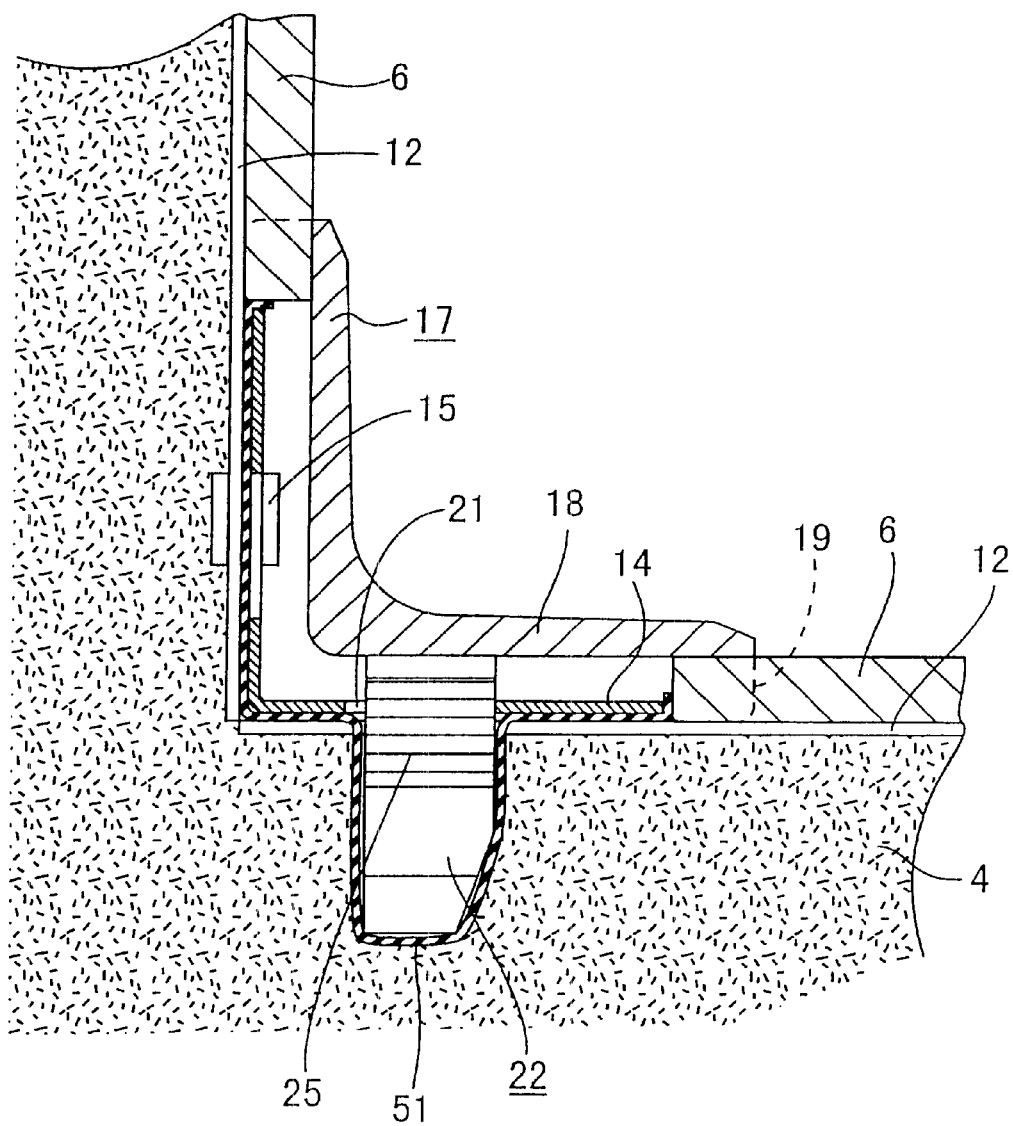
FIG. 24 is a partial longitudinal section of the heat-insulated housing with the heat-insulating material filling the space between the inner and outer boxes.

The corner covers 17 are then mounted on the respective corners. The flanges 19 of the vertical closing plate 18 of the corner cover 17 are applied to the opposed edges of the vertical decorative frame 6. The corner cover 17 is then moved downward along the edges of the vertical decorative frame 6 so that the paired engagement protrusions 22 are inserted into the engagement holes 21 of the reinforcement 14 respectively as shown by arrow in FIG. 21. Both protrusions 22 are inserted while the sheet 51 is extended out along the protrusions and while the protrusions are inwardly flexed, as shown in FIGS. 22 and 23. When the protrusions 22 are inserted until abutting against the horizontal decorative frame 6, one of the engaging teeth 25 of each protrusion 22 elastically engages the lower opening edge of the respective hole 21, whereby the corner cover 17 is mounted at the corner so as to be prevented from falling off. As a result, the corner cover 17 covers the reinforcement 14 and the edges of the respective decorative frames 6 adjacent the reinforcement as shown in FIG. 24.

An outer shell of the heat-insulated housing 1 is formed when four corner covers 17 have been mounted at the corners of the opening 7 respectively. At a heat-insulating material filling site, the outer shell of the heat-insulated housing 1 is placed with the opening 7 facing upward. An undiluted solution of the heat-insulating material 4 is poured from a nozzle etc. through the inlet 53 of the outer box 2 into the space defined between the inner and outer boxes 2 and 3. The undiluted solution is gradually foamed by a chemical change to thereby be expanded. At this time, a gas such as air is discharged through the vent holes 54 outside. Consequently, the space between the boxes 2 and 3 is uniformly filled with the foamed heat-insulating material 4.

During this, the air-impermeable sheet 51 closes the space between the bent portions 11 and 12 at each of the four corners of the opening 7. The sheet 51 further closes the engagement holes 21 reliably without being torn although the protrusions 22 are inserted in the respective holes 21. Additionally, the gaps between the reinforcement 14 and the edges of the decorative frames 6 are also closed by the corner cover 17. Consequently, even if a foaming pressure is excessively high, the foamed heat-insulating material 4 can be prevented from leaking from the corners of the opening 7.

When the foaming pressure is excessively high, there is a possibility that the foamed heat-insulating material 4 may leak out through the vent holes 54. However, portions of the housing 1 formed with the respective vent holes 54 are flat as shown in FIG. 19 although each corner of the opening 7 has a complicated structure. Accordingly, even if the foaming heat-insulating material 4 leaks out through the vent holes 54, it can easily be removed.

Finally, the inlet 53 is closed by a plug, and the vent holes 54 are closed by decorative plugs respectively. Thus, the manufacture of the heat-insulated housing 1 is completed.

According to the above-described embodiment, all the portions of each corner that possibly leave gaps are closed by the air-impermeable sheet 51. These portions include the engagement holes 21 of the reinforcement 14 into which the engagement protrusions 22 of each corner cover 17 respectively. Consequently, the heat-insulating material 4 can reliably be prevented from leaking out of the housing 1.

The heat-insulated housing 1 includes a type having two openings 7 in the front and the rear respectively. When the heat-insulating material 4 is poured into the space between the inner and outer boxes, the heat-insulated housing 1 is sometimes disposed so that either one of the openings 7 is located at the lower side. When the housing 1 has a gap at any corner of the lower opening 7, there is a possibility that the undiluted solution of the heat-insulating material 4 may leak out through the gap. In the foregoing embodiment, however, the gaps at each corner of the opening 7 are completely closed by the air-impermeable sheet 51, whereupon leakage of the solution can be prevented.

Although the EPDM sheet 51 is attached to the backside of the reinforcement 14, the sheet may be made of polychlorovinyl having a closed cell structure or polyethylene having a closed cell structure. Further, the sheet 51 may be a rubber or paper adhesive tape. In the case where either one of these sheets or tapes is used, the engagement protrusions 22 break through the sheet or tape when inserted. Accordingly, there is a possibility that the heat-insulating material 4 may leak out through broken portions of the sheet or tape. However, since the gaps between the decorative frames 6 and the opposed ends of the reinforcement 14 are reliably closed by the sheet or tape, there is almost no possibility that the heat-insulating material 4 leaks outside the corner cover 17.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A heat-insulating housing comprising:

a housing body having a plurality of side plates and an opening in one side of said housing body, the opening having four corners, each of said four corners being defined by two of said plurality of side plates, said two side plates being generally perpendicular to each other, and one of said two side plates having a hole with front and rear engaging open edges on opposite sides of the hole;

a corner cover including two closing plates being disposed to be generally perpendicular to each other and forming a generally L-shaped section, said corner cover having two flanges protruding from opposite side edges of said two closing plates in a direction towards said two side plates, said two flanges being adapted to fit with said two side plates, wherein said two closing plates have backsides abutting against said two side plates of said housing body, respectively;

an engagement protrusion including an insertion body protruding from said backside of one of said two closing plates abutted against said one of said two side plates having the hole and a flexible piece formed by folding a distal end of said insertion body such that said flexible piece spreads outwardly from a distal end of said engagement protrusion towards said one of said two closing plates, said engagement protrusion having a width that is slightly smaller than the front and rear engaging open edges of the hole, and said engagement protrusion being elastically deformable in a direction perpendicular to said two flanges and being formed on said backside of said one of said two closing plates abutting against said one of said two side plates having the hole, and said engagement protrusion being inserted into the hole;

a plurality of engaging teeth formed on said flexible piece of said engagement protrusion such that said plurality of engaging teeth are aligned in a direction of insertion of said engagement protrusion, wherein one of said plurality of engaging teeth is engaged with at least one of the front and rear engaging open edges of the hole when said engagement protrusion is inserted into the hole; and a flexure limiting protrusion provided on said flexible piece so as to be operable to abut against said insertion body of said engagement protrusion to limit an amount of flexure developed in a direction in which said flexible piece approaches said insertion body of said engagement protrusion.

2. A heat-insulating housing according to claim 1, wherein a distal end of said engagement protrusion is pointed.

3. A heat-insulating housing according to claim 1, wherein said flexible piece has a face on which said plurality of engaging teeth are formed, said face being curved such that an amount of flexure of said flexible piece is approximately constant when any of said plurality of engaging teeth engages at least one of the front and rear engaging open edges of the hole.

4. A heat-insulating housing according to claim 2, wherein said flexible piece has a face on which said plurality of engaging teeth are formed, said face being curved such that an amount of flexure of said flexible piece is approximately constant when any of said plurality of engaging teeth engages at least one of the front and rear engaging open edges of the hole.

5. A heat-insulating housing according to claim 1, further comprising:

an additional engagement protrusion including an additional insertion body protruding from said backside of said one of said two closing plates abutted against said one of said two side plates having the hole and an additional flexible piece formed by folding a distal end of said additional insertion body such that said additional flexible piece spreads outwardly from a distal end of said additional engagement protrusion towards said one of said two closing plates, said additional engagement protrusion having a width that is slightly smaller than the front and rear engaging open edges of the hole, and said additional engagement protrusion being elastically deformable in a direction perpendicular to said two flanges and being formed on said backside of said one of said two closing plates abutting against said one of said two side plates having the hole, and said additional engagement protrusion being inserted into the hole;

an additional plurality of engaging teeth formed on said additional flexible piece of said additional engagement protrusion such that said additional plurality of engaging teeth are aligned in a direction of insertion of said additional engagement protrusion, wherein one of said additional plurality of engaging teeth is engaged with at least one of the front and rear engaging open edges of the hole when said additional engagement protrusion is inserted into the hole;

an additional flexure limiting protrusion provided on said additional flexible piece so as to be operable to abut against said additional insertion body of said additional engagement protrusion to limit an amount of flexure developed in a direction in which said additional flexible piece approaches said additional insertion body of said additional engagement protrusion; and a connecting portion connecting said insertion body and said additional insertion body, wherein said engagement protrusion and said additional engagement protrusion are spaced from each other with said plurality of engaging teeth and said additional plurality of engaging teeth directed away from each other.

6. A heat-insulating housing according to claim 2, further comprising:

an additional engagement protrusion including an additional insertion body protruding from said backside of said one of said two closing plates abutted against said one of said two side plates having the hole and an additional flexible piece formed by folding a distal end of said additional insertion body such that said additional flexible piece spreads outwardly from a distal end of said additional engagement protrusion towards said one of said two closing plates, said additional engagement protrusion having a width that is slightly smaller than the front and rear engaging open edges of the hole, and said additional engagement protrusion being elastically deformable in a direction perpendicular to said two flanges and being formed on said backside of said one of said two closing plates abutting against said one of said two side plates having the hole, and said additional engagement protrusion being inserted into the hole;

an additional plurality of engaging teeth formed on said additional flexible piece of said additional engagement protrusion such that said additional plurality of engaging teeth are aligned in a direction of insertion of said additional engagement protrusion, wherein one of said additional plurality of engaging teeth is engaged with at least one of the front and rear engaging open edges of the hole when said additional engagement protrusion is inserted into the hole;

an additional flexure limiting protrusion provided on said additional flexible piece so as to be operable to abut against said additional insertion body of said additional engagement protrusion to limit an amount of flexure developed in a direction in which said additional flexible piece approaches said additional insertion body of said additional engagement protrusion; and a connecting portion connecting said insertion body and said additional insertion body, wherein said engagement protrusion and said additional engagement protrusion are spaced from each other with said plurality of engaging teeth and said additional plurality of engaging teeth directed away from each other.

7. A heat-insulating housing according to claim 3, further comprising:

an additional engagement protrusion including an additional insertion body protruding from said backside of said one of said two closing plates abutted against said one of said two side plates having the hole and an additional flexible piece formed by folding a distal end of said additional insertion body such that said additional flexible piece spreads outwardly from a distal end of said additional engagement protrusion towards said one of said two closing plates, said additional engagement protrusion having a width that is slightly smaller than the front and rear engaging open edges of the hole, and said additional engagement protrusion being elastically deformable in a direction perpendicular to said two flanges and being formed on said backside of said one of said two closing plates abutting against said one of said two side plates having the hole, and said additional engagement protrusion being inserted into the hole;

an additional plurality of engaging teeth formed on said additional flexible piece of said additional engagement protrusion such that said additional plurality of engaging teeth are aligned in a direction of insertion of said additional engagement protrusion, wherein one of said additional plurality of engaging teeth is engaged with at least one of the front and rear engaging open edges of the hole when said additional engagement protrusion is inserted into the hole;

an additional flexure limiting protrusion provided on said additional flexible piece so as to be operable to abut against said additional insertion body of said additional engagement protrusion to limit an amount of flexure developed in a direction in which said additional flexible piece approaches said additional insertion body of said additional engagement protrusion; and a connecting portion connecting said insertion body and said additional insertion body, wherein said engagement protrusion and said additional engagement protrusion are spaced from each other with said plurality of engaging teeth and said additional plurality of engaging teeth directed away from each other.

8. A heat-insulating housing according to claim 4, further comprising:

an additional engagement protrusion including an additional insertion body protruding from said backside of said one of said two closing plates abutted against said one of said two side plates having the hole and an additional flexible piece formed by folding a distal end of said additional insertion body such that said additional flexible piece spreads outwardly from a distal end of said additional engagement protrusion towards said one of said two closing plates, said additional engagement protrusion having a width that is slightly smaller than the front and rear engaging open edges of the hole, and said additional engagement protrusion being elastically deformable in a direction perpendicular to said two flanges and being formed on said backside of said one of said two closing plates abutting against said one of said two side plates having the hole, and said additional engagement protrusion being inserted into the hole;

an additional plurality of engaging teeth formed on said additional flexible piece of said additional engagement protrusion such that said additional plurality of engaging teeth are aligned in a direction of insertion of said additional engagement protrusion, wherein one of said additional plurality of engaging teeth is engaged with at least one of the front and rear engaging open edges of the hole when said additional engagement protrusion is inserted into the hole;

an additional flexure limiting protrusion provided on said additional flexible piece so as to be operable to abut against said additional insertion body of said additional engagement protrusion to limit an amount of flexure developed in a direction in which said additional flexible piece approaches said additional insertion body of said additional engagement protrusion; and a connecting portion connecting said insertion body and said additional insertion body, wherein said engagement protrusion and said additional engagement protrusion are spaced from each other with said plurality of engaging teeth and said additional plurality of engaging teeth directed away from each other.

* * * * *